(12) United States Patent
Stockinger et al.

(10) Patent No.: US 11,904,714 B2
(45) Date of Patent: Feb. 20, 2024

(54) METHOD FOR PRODUCING AN ELECTRICAL CONNECTION OF A VEHICLE CONTACT UNIT, VEHICLE CONNECTION DEVICE, AND VEHICLE

(71) Applicant: Easelink GmbH, Graz (AT)

(72) Inventors: Hermann Stockinger, Graz (AT); Manuel Laublaettner, Graz (AT)

(73) Assignee: EASELINK GMBH

( * ) Notice: Subject to any disclaimer, the term of this patent is extended or adjusted under 35 U.S.C. 154(b) by 0 days.

(21) Appl. No.: 17/886,334

(22) Filed: Aug. 11, 2022

(65) Prior Publication Data
US 2022/0379748 A1    Dec. 1, 2022

Related U.S. Application Data

(63) Continuation of application No. 16/630,728, filed as application No. PCT/EP2018/067094 on Jun. 26, 2018, now Pat. No. 11,427,098.

(30) Foreign Application Priority Data

Jul. 14, 2017 (DE) ...................... 10 2017 115 909.6

(51) Int. Cl.
*B60L 53/14* (2019.01)
*B60L 53/60* (2019.01)
(Continued)

(52) U.S. Cl.
CPC ............... *B60L 53/14* (2019.02); *B60L 50/60* (2019.02); *B60L 53/36* (2019.02); *B60L 53/37* (2019.02); *B60L 53/60* (2019.02); *H02J 7/0045* (2013.01)

(58) Field of Classification Search
CPC ........................................................ B60L 53/14
(Continued)

(56) References Cited

U.S. PATENT DOCUMENTS 9,527,403 B2    12/2016    Mardell et al.
10,434,889 B2   10/2019    Buehs et al.
(Continued)

FOREIGN PATENT DOCUMENTS

CN    104395131 A    3/2015
CN    106536262 A    3/2017
(Continued)

*Primary Examiner* — Jerry D Robbins
(74) *Attorney, Agent, or Firm* — Dilworth IP, LLC (57) ABSTRACT

A method for establishing an electrical connection of a vehicle contact unit of a vehicle which is at least in part electrically powered, to a ground contact unit of an electric charging infrastructure is provided. The ground contact unit has a plurality of electrical contact surfaces, at least two of which have to be contacted by the vehicle contact unit for charging the vehicle battery. The method includes the step of detecting, with the aid of at least one camera on the vehicle, at least one of the electrical contact surfaces and/or at least one insulation surface surrounding the electrical contact surfaces, for establishing an electrical connection. Further provided are a vehicle connection device for electrically connecting a vehicle contact unit of a vehicle which is at least in part electrically powered, to a ground contact unit of an electric charging infrastructure, and a vehicle having a vehicle connection device.

18 Claims, 6 Drawing Sheets

(51) Int. Cl.
  *B60L 50/60* (2019.01)
  *B60L 53/36* (2019.01)
  *B60L 53/37* (2019.01)
  *H02J 7/00* (2006.01)

(58) Field of Classification Search
  USPC ........................................................ 320/109
  See application file for complete search history.

(56) References Cited

U.S. PATENT DOCUMENTS

| | | |
|---|---|---|
| 2009/0272587 A1 | 11/2009 | Ippolito |
| 2013/0249682 A1 | 9/2013 | Van Wiemeersch et al. |
| 2014/0203629 A1 | 7/2014 | Hoffman et al. |
| 2016/0101734 A1 | 4/2016 | Baek |
| 2016/0336772 A1* | 11/2016 | Dallachiesa .......... H02J 7/0045 |
| 2017/0106762 A1* | 4/2017 | Dow ....................... B60L 53/37 |
| 2017/0151883 A1* | 6/2017 | Bae ...................... G05D 1/0246 |
| 2017/0158074 A1 | 6/2017 | Buehs et al. |
| 2018/0239055 A1 | 8/2018 | Widmer |
| 2019/0111842 A1* | 4/2019 | Batur ..................... G06V 20/56 |
| 2019/0176637 A1* | 6/2019 | Booth ................... H02J 7/0014 |

FOREIGN PATENT DOCUMENTS

| | | |
|---|---|---|
| DE | 102013201491 A1 | 7/2014 |
| DE | 102013217713 A1 | 3/2015 |
| EP | 2039557 A1 | 3/2009 |
| EP | 3176023 A1 | 6/2017 |
| GB | 2510125 A | 7/2014 |
| JP | 2005168232 A | 6/2005 |
| WO | 2010056683 A1 | 5/2010 |
| WO | 2017080619 A1 | 5/2017 |

* cited by examiner

METHOD FOR PRODUCING AN ELECTRICAL CONNECTION OF A VEHICLE CONTACT UNIT, VEHICLE CONNECTION DEVICE, AND VEHICLE

FIELD OF THE INVENTION

The disclosure relates to a method for establishing an electrical connection of a vehicle contact unit of a vehicle which is at least in part electrically powered, to a ground contact unit of an electric charging infrastructure. The disclosure further relates to a vehicle connection device for electrically connecting a vehicle contact unit, and a vehicle having such a vehicle connection device.

BACKGROUND OF THE INVENTION

In electrically powered vehicles, such as plug-in hybrid vehicles and pure electric vehicles, the batteries of the vehicles have to be charged regularly, preferably after each trip. For this purpose, the vehicle is connected to the charging infrastructure by means of a vehicle connection system.

For example, vehicle connection systems with a contact unit of the charging infrastructure that is provided on the ground are known. This ground contact unit, arranged on the ground, is physically contacted by means of a displaceable vehicle contact unit, which can move downwards from the underbody of the vehicle. This allows the vehicle to be electrically connected to the charging infrastructure.

These vehicle connection systems require a physical contact between the electrodes of the vehicle contact unit and the contact surfaces of the ground contact unit. In these systems, problems occur due to the vehicle contact unit not resting correctly on the contact surfaces of the ground contact unit, for example because of soiled, covered or damaged contact surfaces and, as a result of this, a charge transfer between the charging infrastructure and the vehicle cannot be effected or cannot be effected efficiently.

SUMMARY OF THE INVENTION

Thus, there is a need to provide a method and a vehicle connection device which can provide an electrical connection of the contact unit arranged at the vehicle to a contact unit, arranged on the ground, of the charging infrastructure with high quality and low losses. A further need is to provide a vehicle having such a vehicle connection device.

For this purpose, a method for establishing an electrical connection of a vehicle contact unit of a vehicle which is at least in part electrically powered and has a vehicle battery, to a ground contact unit of an electric charging infrastructure is provided. The charging infrastructure includes a plurality of electrical contact surfaces, at least two of which have to be contacted by the vehicle contact unit for charging the vehicle battery. The method comprises the step of detecting, with the aid of at least one camera on the vehicle, at least one of the electrical contact surfaces and/or at least one insulation surface surrounding the electrical contact surfaces, for establishing an electrical connection. In this way, the electrical contact surfaces and their positions are detected directly or indirectly via the surrounding insulation surface. This means that the electrical contact surfaces can be approached in a targeted manner, as a result of which an electrical connection of the vehicle contact unit to the ground contact unit can be ensured with high quality and low losses.

Within the scope of this disclosure, a camera is understood to mean any optical detection means, such as, e.g., a CCD camera, an array of photodiodes or the like.

Alternatively, the electrical contact surfaces may also be detected indirectly by detecting markings that are provided at close range (approx. 2-5 m away) of a respective ground contact unit and allow conclusions to be drawn about the positions of the electrical contact surfaces of the ground contact unit. In this way, the ground contact unit can be detected even if it is completely covered by leaves, for example.

The method may additionally comprise the step of determining, with the aid of at least one camera on the vehicle, which electrical contact surfaces of the ground contact unit are suitable for the electrical connection. In this context, an electrical contact surface is considered to be suitable for the electrical connection if it is either exposed, i.e. not covered and in particular not soiled, or if it is only slightly soiled so that when it is contacted, an electrical connection can be established with no or only low power losses. In particular, an electrical contact surface is furthermore only considered to be suitable for the electrical connection if it does not exhibit any mechanical damage that significantly impairs the electrical connection. If the vehicle and/or the vehicle contact unit includes a cleaning device or a cleaning function, even a more heavily soiled or even completely covered electrical contact surface may be considered suitable for the electrical connection. Examples of removable soiling or objects that may cover electrical contact surfaces include liquids, in particular water or oil, salt crusts, pollen, tire wear particles, brake dust, loose chippings, leaves and paper. In order to determine which electrical contact surfaces of the ground contact unit are suitable for the electrical connection, in particular the image data of the camera can be compared with one or more reference images. Furthermore, it is not necessary for all electrical contact surfaces of the ground contact unit to be within the field of view of the camera. It may also be sufficient to observe only a portion of the ground contact unit. In this step, it is thus determined which electrical contact surfaces of the ground contact unit are, in principle, suitable for the electrical connection due to their position, arrangement and/or quality or nature, and which are not.

In step b) of the method, it may further be determined, with the aid of the at least one camera on the vehicle, which contact surfaces are exposed for the electrical connection and/or whether a soiling of the ground contact unit is opposed to a safe charging process. An electrical contact surface here is considered to be exposed for the electrical connection if it is not covered and in particular not soiled or only slightly soiled, so that when it is contacted, an electrical connection can be established that involves no or only low power losses.

In addition, certain kinds of soiling may oppose a safe charging process. If a charging process were to be carried out in spite of this soiling, such soiling would result in that only a poor or even insufficient electrical contact may be achieved between the soiled contact surface and the corresponding electrode and/or that the soiling, e.g. a puddle of water, electrically connects two contact surfaces with each other, so that creeping currents are produced between the contact surfaces concerned or even a short circuit occurs, preventing safe charging.

In order to determine which electrical contact surfaces of the ground contact unit are exposed for the electrical connection, here too in particular the image data of the at least one camera can be compared with one or more reference images. In this way, the electrical contact surfaces are identified which are directly available for an electrical connection with high quality and low losses.

Additionally or alternatively, in step b) of the method it may be determined, with the aid of the at least one camera on the vehicle, which electrical contact surfaces for the electrical connection are not exposed and show a soiling which, in particular, is cleanable. This also includes electrical contact surfaces which cannot be directly detected by the at least one camera, for example because they are completely covered by a leaf. The type of soiling that is considered cleanable basically depends on the cleaning device or cleaning function of the vehicle and/or the vehicle contact unit.

Soiling is considered to be non-cleanable if, for example due to its mass, consistency and/or adhesive properties, it cannot, or not efficiently, be removed by the cleaning device or the cleaning function of the vehicle and/or of the vehicle contact unit.

This in particular includes objects having a mass of more than 10 g, such as larger stones, as well as chewing gum and droppings. Mechanical damage to the electrical contact surfaces that significantly impairs the electrical connection may also count as non-removable soiling. In this way, the electrical contact surfaces are determined which are in principle available for an electrical connection, but require prior cleaning.

According to an alternative embodiment, the method includes the step of selecting an area of the ground contact unit that is to be headed for for electrical connection, the area including a group of exposed contact surfaces by means of which the electrical connection can be established. The group particularly corresponds exactly to the number of electrical contact surfaces in exactly the arrangement required to establish an electrical connection. Preferably, the area consists of the group. This ensures a reliable electrical connection with high quality.

The method may further include the step of selecting an area of the ground contact unit that is to be headed for electrical connection, the area including at least one contact surface which is not exposed for establishing an electrical connection. In particular, the area corresponds exactly to the number of electrical contact surfaces in exactly the arrangement required to establish an electrical connection. When making the selection, exclusively those electrical contact surfaces are considered which are suitable and are exposed or considered cleanable. This means that severely damaged or heavily soiled electrical contact surfaces are not part of the area of the ground contact unit that is to be approached for electrical connection. Therefore, areas with soiled but cleanable electrical contact surfaces can also be utilized for establishing an electrical connection, as a result of which it is not only easier and faster to establish the electrical connection, but it is also possible to use ground contact units for establishing an electrical connection which would otherwise not be usable because they do not exhibit an appropriate group of exposed contact surfaces by means of which an electrical connection can be established.

After selecting the area, it may be provided that the vehicle contact unit is moved downward against the ground contact unit to establish the electrical connection. In doing so, the electrical connection is established in particular in the selected area so that an electrical connection with high quality and low losses is ensured.

In an alternative embodiment, the method includes performing a fully automatic cleaning step. In particular, step b) is performed subsequent to the cleaning step in order to determine again which electrical contact surfaces are suitable for the electrical connection after the cleaning. The cleaning process allows soiling to be removed and electrical contact surfaces to be exposed, which are then available for establishing an electrical connection. Provision may be made for a plurality of cleaning steps, in particular if cleaning has not been successful, for example in the case of heavy soiling, which requires a greater cleaning effort.

Provision may further be made that after selecting the area, the vehicle is moved, steering automatically, or optical steering signals are output in the interior for the driver for manual steering of the vehicle in order to place the vehicle contact unit in a position in which it can be coupled to the selected contact surfaces. In this way, the maneuver of the vehicle required for coupling can be facilitated or taken over for the driver, whereby comfort is increased and a safe establishment of the electrical connection between the vehicle contact unit and the ground contact unit can be ensured.

For performing step a) and/or step b), an underbody camera and/or a front camera and/or a rear camera of the vehicle may be used. The underbody camera has the advantage that the ground contact unit and/or the electrical contact surfaces can be detected even when the vehicle is located above the ground contact unit.

Provision may further be made for a specific number of electrical contact surfaces, in particular in the selected area, to be electrically connected only after the electrical connection has been established between the vehicle contact unit and the ground contact unit. Preferably, only those electrical contact surfaces are connected here which are required for the charge transfer.

For this purpose, according to the disclosure a vehicle connection device for electrically connecting a vehicle contact unit of a vehicle which is at least in part electrically powered and has a vehicle battery, to a ground contact unit of an electric charging infrastructure is also provided. The ground contact unit has a plurality of electrical contact surfaces, at least two of which have to be contacted by the vehicle contact unit for charging the vehicle battery. The vehicle connection device includes the vehicle contact unit, at least one camera and a controller coupled to the camera. Furthermore, the vehicle connection device is particularly configured to carry out the method according to the disclosure. The controller is configured such that it can determine exposed electrical contact surfaces of the ground contact unit by means of the at least one camera. This may be effected, for example, in that the image data of the camera are compared with one or more reference images. This allows exposed contact surfaces to be specifically approached for the electrical connection of the vehicle contact unit to the ground contact unit and an electrical connection with high quality and low losses to be provided when the vehicle battery is charged.

The vehicle connection device may comprise a cleaning device which is provided for exposing and/or cleaning the electrical contact surfaces of the ground contact unit at least in the selected area. The selected area is the area that is intended for electrical connection of the vehicle contact unit to the ground contact unit. Electrical contact surfaces can be cleaned and/or exposed by means of the cleaning device by removing soiling and/or foreign bodies. This allows the quality of the electrical connection to be improved and thus power losses to be reduced.

According to one embodiment, the controller for a positioning aid, by means of which the vehicle can be positioned, steering automatically, relative to a ground contact unit of an electric charging infrastructure, is configured such that it can detect visual features on the ground contact unit which are stored as a reference in the controller. Additionally or alternatively, visual features can be detected which are provided in the close range, i.e. up to 3 m away from the ground contact unit, for example on the parking space or the parking space boundary of the ground contact unit. These features, which are for example markings or codes, are intended for orientation and facilitate navigation and the detection of the ground contact unit and/or the electrical contact surfaces.

To this end, the electrical contact surfaces of the ground contact unit may constitute a visual feature for the positioning aid, for example based on their arrangement, their shape and/or markings provided directly on the electrical contact surfaces, such as notches. Since the electrical contact surfaces are usually made of a resistant metallic material, the feature can be provided permanently in this way.

Alternatively or in addition, the visual feature may also include a reflection and/or the intensity of the reflection of the light from a lighting device of the vehicle contact unit at the contact surfaces. For example, the contact surfaces can be identified based on their stronger reflection in comparison with the reflection of the insulation surface.

The subject matter of the disclosure further is a vehicle including a vehicle connection device for electrically connecting a vehicle contact unit of a vehicle which is at least in part electrically powered, to a ground contact unit of an electric charging infrastructure. Here, the vehicle connection device is in particular a vehicle connection device according to the disclosure. The vehicle further includes an underbody camera for optically detecting the ground contact unit. The underbody camera is a camera which views the ground under the vehicle and, in particular, is arranged on the underside of the vehicle. Preferably, the vehicle contact unit is also within the field of view of the underbody camera, particularly in the extended state of the vehicle contact unit. It is further possible to monitor the ground contact unit during charging, for example in order to initiate a protective reaction when an animal walks on the ground contact unit and/or touches or moves the vehicle contact unit. A protective reaction may, for example, consist in emitting an acoustic signal to drive the animal away, or in reducing or turning off the voltage of the electrical contact surfaces. In this way, the electrical contacts can be approached more precisely and safety can be increased. If the vehicle and/or the vehicle contact unit includes a cleaning device or cleaning function, the underbody camera can further determine the result of a cleaning step without the vehicle having to be moved for this purpose.

In an alternative embodiment, the vehicle includes a protective means which covers the lens of the underbody camera, in particular to protect it from soiling and/or damage. The protective means is configured and controlled such that it uncovers the lens when a procedure of electrically connecting the vehicle contact unit to a ground contact unit of an electric charging infrastructure is initiated. After the connection has been established or after the charging process has been completed, the lens is covered again. This protects the lens and the camera during the time when it is not in use, thus avoiding functional errors such as incorrect detection of exposed electrical contact surfaces due to a soiled or scratched lens.

The vehicle may further include a lighting device that is provided to illuminate the image-taking area of the underbody camera in order to improve the quality of the image data and thus the detection capability. In particular, the lighting device is adapted to provide light in a special wavelength range such as UV, which allows appropriately designed markings to be particularly easily detected, and can thus additionally improve the capabilities of detecting the marking or determining the electrical contact surfaces. The lighting device includes, for example, one or more LEDs.

According to a further embodiment, the vehicle may have an electronic controller for autonomous steering. In addition or alternatively, the controller may provide a positioning aid, by means of which the vehicle can be positioned, steering automatically, relative to a ground contact unit of an electric charging infrastructure. Furthermore, the controller may additionally or alternatively be connected to a visual direction indicator in the vehicle interior, which can indicate to where the driver is to steer the vehicle, so that an electrical connection of a vehicle contact unit of the vehicle to the ground contact unit can be established. If the vehicle connection device includes a controller, this controller may be identical to the controller of the vehicle connection device. In this way, the driver can be assisted by the controller during a coupling maneuver, or the controller independently takes over the maneuvering of the vehicle to establish an electrical connection. This increases the comfort for the driver and ensures that the electrical connection between the vehicle contact unit and the ground contact unit can be established correctly.

To provide a more accurate positioning aid, further sensors or facilities such as GPS, WLAN, ultrasound or NFC may be provided. Furthermore, the steering angle and the wheel speed of one or more wheels of the vehicle may be taken into account for the positioning aid.

It is also conceivable that at least one coil and/or at least one radio transmitter is/are arranged at least one predetermined point in the ground contact unit and the vehicle contact unit includes a corresponding receiver for electromagnetic signals and/or radio signals. Using the signals that are received by the receiver and were generated by the coil and/or the radio transmitter, the position of the vehicle contact unit relative to the ground contact unit can be determined, for example by means of triangulation.

BRIEF DESCRIPTION OF THE DRAWINGS

Further features and advantages of the disclosure will be apparent from the description below and from the accompanying drawings, to which reference is made and in which.

DETAILED DESCRIPTION OF THE INVENTION

Lists having a plurality of alternatives connected by "and/or", for example "A, B and/or C" are to be understood to disclose an arbitrary combination of the alternatives, i.e. the lists are to be read as "A and/or B and/or C". The same holds true for listings with more than two items.

Figure 1:
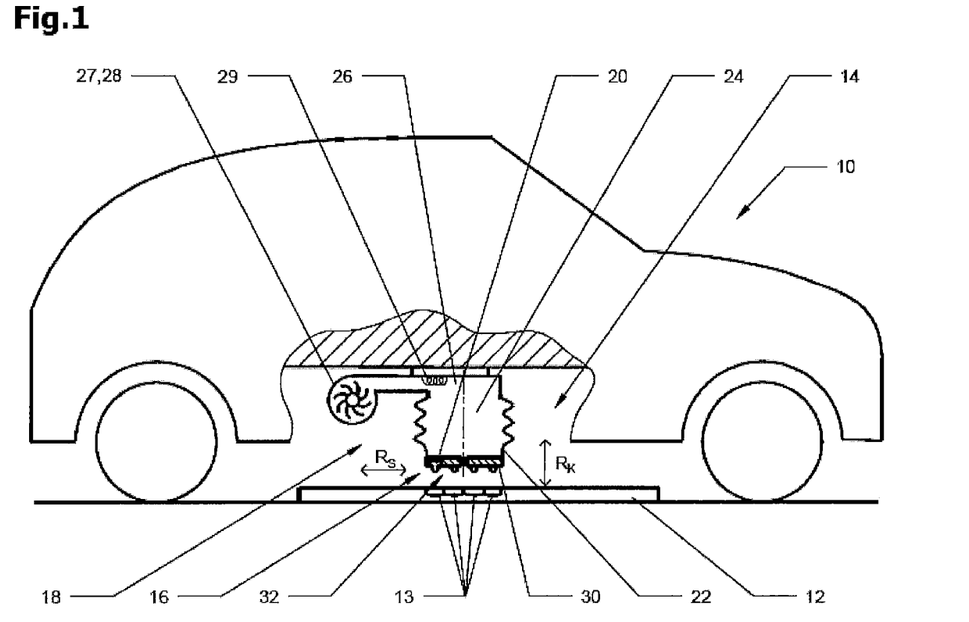
FIG. 1 schematically shows a vehicle according to the disclosure with a vehicle connection device according to the disclosure.

FIG. 1 illustrates a vehicle 10, for example a battery-powered vehicle or a plug-in hybrid vehicle, parked on or above a ground contact unit 12 having contact surfaces 13 of an electric charging infrastructure (not shown).

The electric charging infrastructure serves to recharge the batteries of the vehicle 10, in particular after a trip.

The underbody of the vehicle 10 has a vehicle connection device 14 fastened to it, which can electrically connect the vehicle 10 to the charging infrastructure, more precisely, which can electrically connect a vehicle contact unit 16 to the ground contact unit 12.

Figure 3:
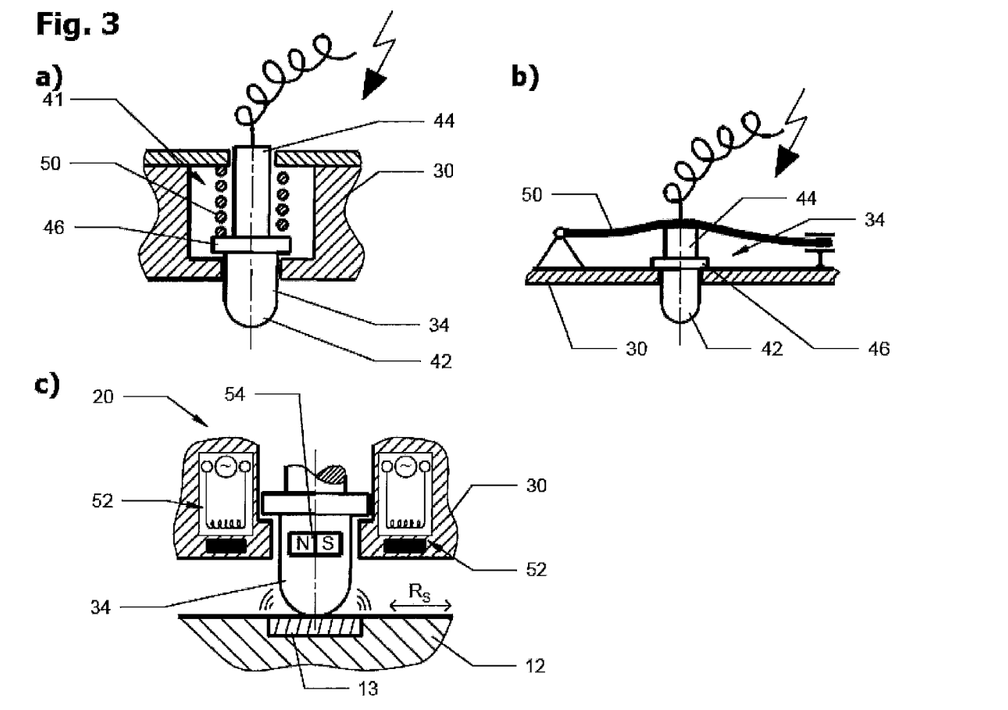
FIGS. 3a and 3b show sectional views of the vehicle contact unit in the region of an electrode in various embodiments for resiliently mounting the electrode.
FIG. 3c shows an enlarged view of a single electrode with a sliding actuator.

Besides the vehicle contact unit 16, the vehicle connection device 14 includes a contacting actuator 18 and a sliding actuator 20 (FIG. 3c).

The contacting actuator 18 may comprise a bellows 22 having an interior space 24 and a basic section 26, and a compressed air source 27, such as a compressor 28. A heating coil 29 that heats the air in the interior space 24 of the bellows 22 may further be provided in the interior space 24 of the bellows 22 or in an air supply duct to the bellows 22.

The compressed air source 27 is in fluid communication with the interior space 24, so that the compressed air source 27 can inflate the bellows 22.

A vehicle-side first end of the bellows 22 is fastened to the vehicle 10, in particular to the underbody of the vehicle, by means of the basic section 26. The vehicle contact unit 16 is fastened to the second end of the bellows 22 facing away from the vehicle 10.

Figure 2:
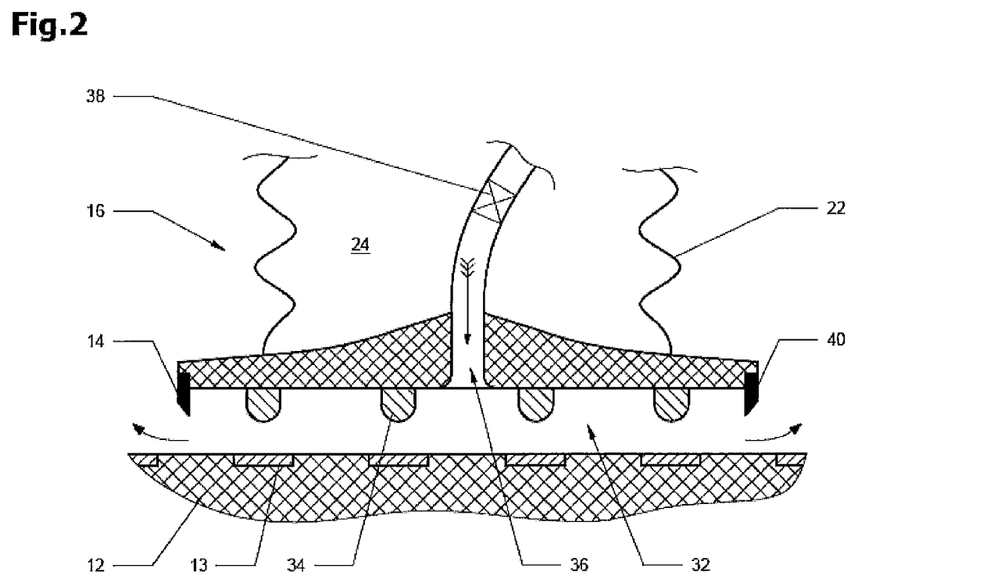
FIG. 2 shows a greatly simplified and schematic sectional view of the vehicle contact unit of the vehicle connection device according to FIG. 1.

The vehicle contact unit 16 is illustrated in FIG. 2 and includes a base 30, for example in the form of a plate, in particular a circular plate, which closes the second end of the bellows 22. The plate is particularly made from a plastic material.

On the front side of the base 30 facing away from the vehicle 10, that is, the side of the base 30 facing the ground contact unit 12, the base 30 has a contacting area 32 in which at least two electrodes 34 are arranged.

Further provided in the base 30 is an air outlet 36 which, on the one hand, is supplied from the interior space 24 and, on the other hand, opens into the contacting area 32. The air outlet 36 may also be configured as an air nozzle.

For example, the air outlet 36 opens out between two electrodes 34 and in the center of the base 30, i.e. centrally and in the region of the center of the contacting area 32. As a result, the air outlet 36 is directed into a region in front of the contacting area 32, that is, into a region between the base 30 and the ground contact unit 12.

The air outlet 36 is connected to the interior space 24 by means of a controllable valve 38, which may be in the form of a throttle, so that air from the interior space 24 can be blown out of the air outlet 36 if required.

In addition, the base 30 includes a sealing lip 40, which is provided on the outer circumference of the base 30 and completely encircles the base 30 and the contacting area 32.

As can be seen in FIG. 3a, the electrodes 34 in the base 30 are each spring-mounted in a respective cavity 41 of the base 30.

The electrodes 34 are configured as pins and each include a contact tip 42, a base body 44 and a shoulder 46, which is arranged between the base body 44 and the contact tip 42.

The shoulder 46 and portions of the base body 44 are arranged within the cavity 41, whereas the contact tip 42 extends from the cavity 41 in the contacting area 32 and projects in relation to the front side of the base 30.

Also provided in the cavity 41 is a spring 50, which rests, on the one hand, against the wall of the cavity 41 facing away from the contacting area 32 and, on the other hand, against the shoulder 46.

The spring 50 is a compression spring so that it exerts a force on the shoulder 46 and thus on the entire electrode 34 towards the contacting area 32.

It is also conceivable, as illustrated in FIG. 3b, that the spring 50 is a leaf spring which acts on the end of the base body 44 facing away from the contact tip 42.

FIG. 3c shows the sliding actuator 20 of the first embodiment, which is provided on each of the electrodes 34. The sliding actuator 20 includes three magnets. Two of the three magnets are electromagnets 52, i.e. switchable, and are arranged in the base 30 at the respective electrode 34 on opposite sides of the electrode 34.

The third magnet is a permanent magnet 54, which is provided in the electrode 34 such that it is positioned between the two electromagnets 52.

Now if the two electromagnets 52 are operated such that they have opposite polarities, the permanent magnet 54 inside the electrode 34 is attracted by one of the electromagnets 52 and repelled by the other. This causes the electrode 34 to move laterally, i.e. transversely to its longitudinal extent, in a sliding direction $R_s$.

Then when the polarities of the electromagnets 52 are reversed, the electrode 34 is moved in the opposite direction. This allows the electrode 34 to be reciprocated laterally by a quick changeover of the electromagnets 52.

Figure 4:
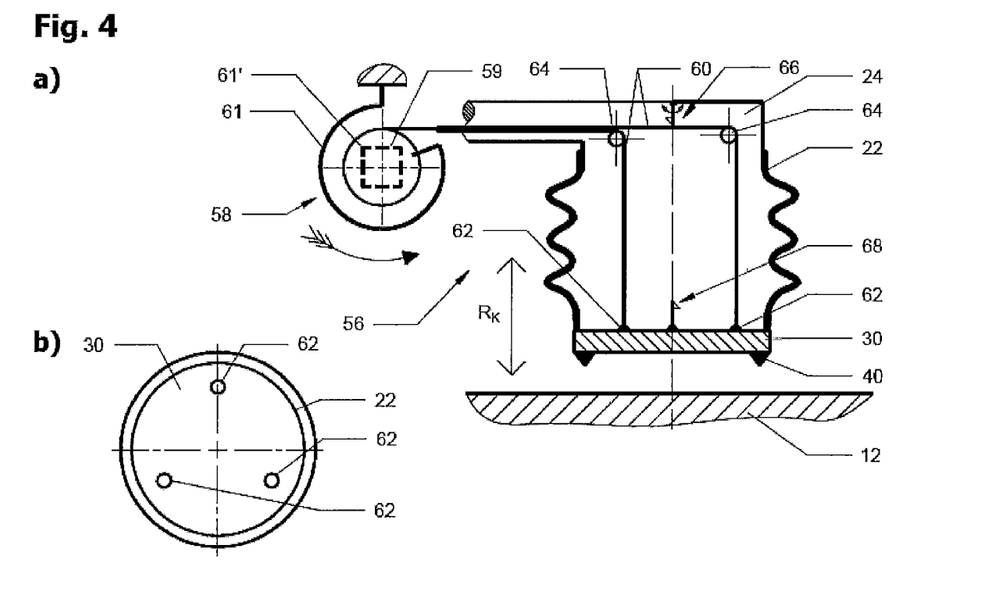
FIGS. 4a and 4b show greatly simplified schematic sectional views of the vehicle connection device according to FIG. 1 in a longitudinal and a cross section, respectively.

FIG. 4a illustrates a guide device 56 of the contacting actuator 18, which is not shown in FIG. 1 for reasons of clarity. On the other hand, FIG. 4a does not illustrate the air outlet 36 and the compressor 28. The guide device 56 includes a restoring drive 58 and tension elements 60.

The restoring drive 58 has a spindle 59 which is mounted for rotation in relation to the vehicle 10, tension elements 60 and a spiral spring 61.

One end of the spiral spring 61 is fastened to the spindle 59 and its other end is fixed to the vehicle 10 so that the spiral spring 61 can apply a torque to the spindle 59.

It is also conceivable that instead of or in addition to the spiral spring 61, an electric motor drive 61', such as an electric motor, is provided for rotating the spindle 59. FIG. 4a illustrates, in dashed lines, such an electric motor drive 61' in the form of an electric motor.

The tension elements 60 may be bands, cords or ropes, and are also attached by one end to the spindle 59, so that the tension elements 60 are rolled up on the spindle 59 when the spindle 59 is rotated.

The other end of each of the tension elements 60 is connected to the base 30 at a connection point 62.

As can be seen in FIG. 4b, in the embodiment shown, three tension elements 60 are provided, which are each connected to the base 30 at a respective connection point 62.

The connection points 62 are arranged in an equilateral triangle, the center of which is at the same time the center of the base 30.

The tension elements 60 run from the connection points 62 in the interior space 24 of the bellows 22 vertically from the base 30 towards the basic section 26. The tension elements 60 are deflected by means of deflection pulleys 64, which may be provided in the interior space 24, and are then guided towards the spindle 59.

Here, the length of the tension elements 60 is selected such that the three connection points 62 and thus the base 30 are always oriented horizontally. In this way, the base 30 is always parallel to the ground contact unit 12.

For locking the vehicle contact unit 16 in its retracted position, a first locking element 66 and a second locking element 68 are further provided in the middle of the base 30 in the interior space 24 and on the opposite side at the basic section 26, respectively, the locking elements being configured as latching hooks in the first embodiment shown.

The second locking element 68, i.e. the latching hook at the basic section 26, is swivel-mounted here and can be swiveled from its vertical position.

Figure 5:
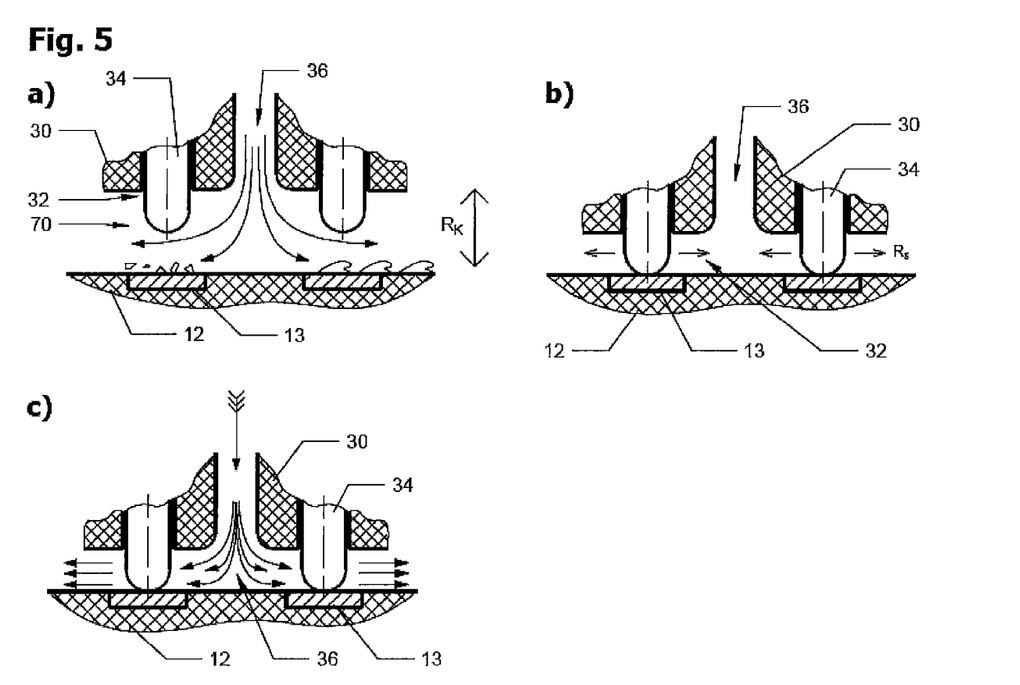
FIGS. 5a to 5c show various steps during the production of the electrical connection between the vehicle contact unit and a ground contact unit.

FIGS. 5a to c illustrate various steps during the contacting of the vehicle contact unit 16 with the ground contact unit 12.

The vehicle contact unit 16 can be moved towards and away from the ground contact unit 12 with the aid of the contacting actuator 18. Here, the direction of movement is perpendicular to the ground contact unit 12 and perpendicular to the contacting area 32 and will be referred to as the contacting direction $R_k$ below.

It is, of course, also conceivable that the vehicle contact unit 16 is not only moved in the contacting direction $R_k$ by the contacting actuator 18, but that when the vehicle contact unit 16 is lowered, a movement component in some other direction can be added at the same time. This is the case, for example, if the contacting actuator 18 is a swivel arm.

When the vehicle connection device 14 is in its retracted position, i.e. the vehicle contact unit 16 is pulled close to the basic section 26, the bellows 22 is pushed together and the locking hooks, i.e. the first locking element 66 and the second locking element 68, are in engagement with each other.

The locking elements 66, 68 thus hold the bellows 22 in its collapsed position.

Now when the vehicle 10 is parked above a ground contact unit 12, it is intended to charge the vehicle. For this purpose, the vehicle contact unit 16 is lowered, that is, moved towards the ground contact unit 12.

First, the second locking element 68 is swiveled so that the bellows 22 is released and can be inflated.

Then the compressed air source 27, i.e. here the compressor 28, is activated and supplies compressed air to the interior space 24 of the bellows 22. The bellows 22 is inflated and stretched by the compressed air, as a result of which the vehicle contact unit 16 is moved towards the ground contact unit 12 in the contacting direction $R_k$.

In the process, the tension elements 60 are evenly unwound from the spindle 59 so that the horizontal orientation of the base 30 of the vehicle contact unit 16 is maintained during movement as well. At the same time, the spiral spring 61 is tensioned by the rotation of the spindle 59, so that the spiral spring 61 applies a torque to the spindle 59 contrary to the unwinding direction of the tension elements 60.

The vehicle contact unit 16 is first lowered until a gap 70 has formed between the base 30 and the ground contact unit 12. At this point in time, the electrodes 34 do not yet touch the contact surfaces 13 of the ground contact unit 12. In this position, the ground contact unit 12 is blown free.

The blowing-free process is illustrated in FIG. 5a. For blowing free, the valve 38 of the air outlet 36 is opened so that the compressed air can escape from the interior space 24 of the bellows 22. Since the air outlet 36 is directed into the area in front of the contacting area 32, in which the ground contact unit 12 is now located, the air stream from the air outlet 36 impinges on the ground contact unit 12.

It is, of course, also possible to provide a plurality of air outlets 36 from which compressed air can flow out of the interior space 24 in order to blow the ground contact unit free. It is further conceivable that the individual air outlets 36 can be opened or closed separately or in groups.

The air impinging on the ground contact unit 12 then flows radially outwards through the gap 70 at high speed. The strong air stream also causes cleanable soiling such as dirt, leaves or liquid, which were located on the ground contact unit 12, to be transported outwards. In case of temperatures below freezing or if there is already a layer of snow or ice, the heating 29 is activated so that the layer of snow or ice is removed and the contacts are dried.

The steady air flow allows the ground contact unit 12 to be blown free in that area which is now opposite the contacting area 32 of the vehicle connection device 14, so that the contact surfaces 13 in this area are free of soiling such as dirt, leaves or liquid.

At the same time, the compressed air causes an air cushion to be formed in the gap 70, making it easier to move the vehicle contact unit 16 in relation to the ground contact unit 12, which facilitates a lateral alignment of the vehicle contact unit 16 relative to the ground contact unit 12.

After the ground contact unit 12 has been blown free, the vehicle contact unit 16 is lowered further, i.e. moved towards the ground contact unit 12. In the process, air may continue to flow out of the air outlet 36.

During the lowering process, the gap 70 decreases and the sealing lip 40 and the electrodes 34 eventually come into contact with the ground contact unit 12. The guide device 56 ensures that the vehicle contact unit 16 is parallel to the ground contact unit 12, so that it is made sure at all times that all of the electrodes 34 rest on the ground contact unit 12.

The extended charging position of the vehicle contact unit 16 has been reached.

In this position the sealing lip 40 closes the gap 70 in the radial direction so that no dirt, leaves or liquid can return into the gap 70.

It is also conceivable that no sealing lip 40 is provided. In this case, a permanently increased air pressure within the gap 70 can prevent any impurities from returning into the gap 70.

In addition, the spindle 59 or the spiral spring 61 may be blocked so that no tensile force acts on the tension elements 60 to pull the vehicle contact unit 16 upwards from the charging position. This allows the power of the compressed air source 27, in this case the compressor 28, to be reduced during charging.

Then when the electrodes 34 have come into contact with the contact surfaces 13 of the ground contact unit 12, the contact surfaces 13 are rubbed free or abraded free, as indicated in FIG. 5b, to remove any oxide layer that may have formed on the contact surfaces 13 and/or on the electrodes 34.

Using the sliding actuators 20, the electrodes 34 are moved in their transverse direction, as described with respect to FIG. 3c. The direction of movement, which will be referred to as the sliding direction $R_s$ below, is parallel to the front side of the base 30 and the surface of the contact surfaces 13 and transverse to the contacting direction $R_k$. This means that the electrodes 34 are moved along the contact surfaces 13 and thus slide over the contact surfaces 13, i.e. any oxide layer is removed, so that an electrical connection between the electrodes 34 and the contact surfaces 13 is realized with very low resistance.

In this way, the vehicle 10 is now electrically connected to the charging infrastructure and can be charged.

During charging, an electrical current flows through the electrodes 34, resulting in heating of the electrodes 34 and thus in an increase in the electrical resistance within the electrodes 34 and thermal loading of the electrodes 34 and the surrounding components. In order to cool the electrodes 34, the valve 38 of the air outlet 36 may be open during the entire charging process, so that a continuous air stream flows through the gap 70, which cools the electrodes 34. In this way, losses during charging of the vehicle 10 are reduced and higher charging capacities are achieved.

When the vehicle 10 is fully charged or the vehicle 10 is to be moved, the vehicle contact unit 16 needs to be retracted.

To this end, the compressed air is first discharged from the interior space 24 of the bellows 22 and the compressed air source 27 is deactivated, in this case the compressor 28 is switched off. The pressure from the interior space 24 can be released by means of the air outlet 36 and/or by a further valve (not shown) on the bellows 22.

This is followed by activation of the restoring drive 58. For this purpose, the lock of the spindle 59 or of the spiral spring 61 is released, so that the spiral spring 61 applies a torque to the spindle 59 contrary to the direction of rotation during unwinding. The torque causes the spindle 59 to rotate so that a tensile force acts on the tension elements 60, pulling the tension elements 60 towards the spindle 59.

If an electric motor drive 61' of the spindle 59 is provided, the spindle 59 may of course also be driven by it or the spiral spring 61 may be assisted by it.

The tension elements 60 are thereby wound up onto the spindle 59, as a result of which the base 30 is moved evenly upwards away from the ground contact unit 12 and the bellows 22 is pushed together. Alternatively, the operational system of the compressed air source 27 for generating the overpressure may also be switched over to a negative pressure mode so that it evacuates the bellows 22 and causes it to contract.

When the bellows 22 has reached its collapsed position, the two locking elements 66, 68 lock into each other and hold the bellows 22 in this position.

The vehicle contact unit 16 is now securely stowed at the underbody of the vehicle 10, and the vehicle 10 may be moved safely.

After a detailed description above of the vehicle connection device 14 with its cleaning device in the form of the air outlet 36 and/or the compressed air source 27, it will be described in the following how the vehicle 10 or the vehicle connection device 14 is positioned relative to the ground contact unit 12 in order to establish the electrical connection between the vehicle connection device 14 and the ground contact unit 12.

Figure 6:
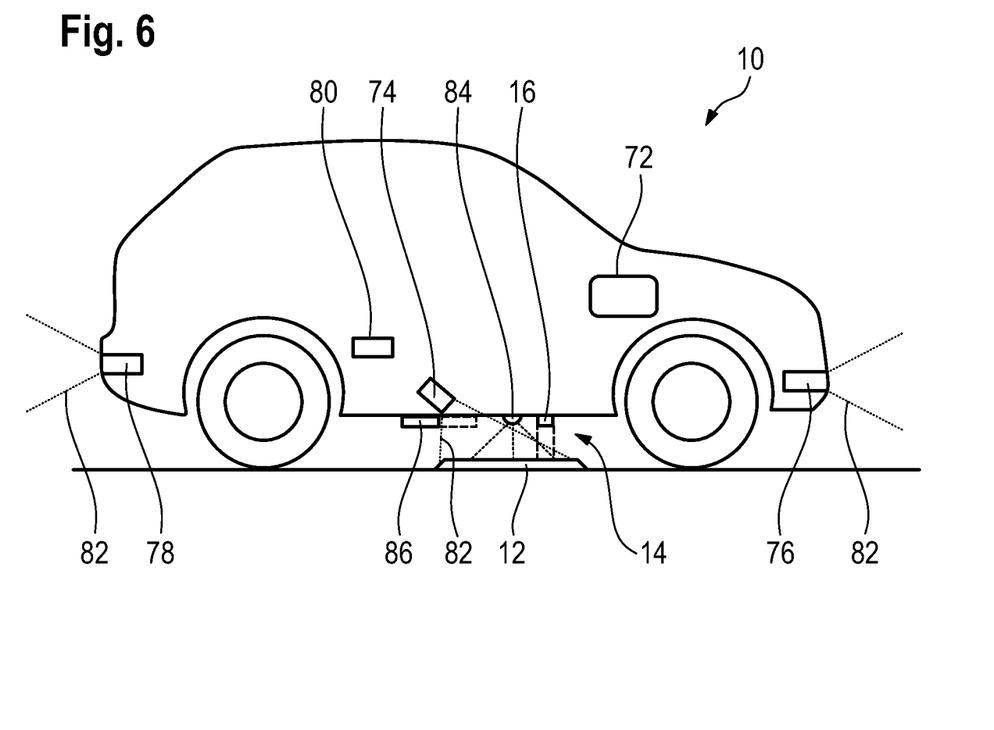
FIG. 6 shows, in a schematic illustration, further installations of the vehicle of FIG. 1.

For this purpose, the vehicle 10 comprises a controller 72 as well as an underbody camera 74, a front camera 76, a rear camera 78 and two side cameras 80 (see FIG. 6), only one side camera 80 being illustrated in FIG. 6.

The controller 72 is formed by the on-board computer of the vehicle 10, which also forms the controller 72 of the vehicle connection device 14. In an alternative embodiment, separate controllers, which are preferably in communication with each other, may be provided for the vehicle 10 and the vehicle connection device 14.

The cameras 74, 76, 78, 80 are coupled to the controller 72 and supply image data that can be evaluated by the controller 72, for example to determine the electrical contact surfaces 13 of a ground contact unit 12 and/or to allow autonomous driving, even at higher speeds.

The fields of view 82 of the underbody camera 74, the front camera 76 and the rear camera 78 are depicted in FIG. 6 by dotted lines and are directed to the ground under the vehicle 10 as well as to the areas in front of and behind the vehicle 10, respectively. The fields of view of the side cameras 80 are directed to the areas laterally beside the vehicle 10, but are not illustrated in FIG. 6.

In the exemplary embodiment shown, the underbody camera 74 is arranged behind the vehicle contact unit 16, i.e. closer to the rear of the vehicle 10. The vehicle contact unit 16 here is located in the field of view 82 of the underbody camera 74 at least in the extended loading position (illustrated in FIG. 6 by a dashed line), so that the underbody camera 74 can view in particular the area which is intended to establish an electrical connection between the vehicle contact unit 16 and the ground contact unit 12.

In an alternative embodiment, fewer or more cameras 74, 76, 78, 80 may be provided for the vehicle 10 or the vehicle connection device 14. Furthermore, cameras 74, 76, 78, 80 with overlapping fields of view 82 may be provided, which take images of the same area from different perspectives. In this way, more information can be made available for evaluation, which facilitates image analyses. Moreover, the redundancy improves functional reliability.

A lighting device 84 is mounted to the underbody of the vehicle 10 between the underbody camera 74 and the vehicle contact unit 16 and is configured to illuminate, at least in sections, the area that is within the field of view of the underbody camera 74 in order to increase the picture quality of the images taken by the underbody camera 74 and thus facilitate an evaluation of the image data.

The lighting device 84 comprises a lamp (not shown), for example one or more light-emitting diodes, a gas discharge lamp or a light bulb.

To protect the underbody camera 74, a protective means in the form of a protective flap 86 is provided on the underbody of the vehicle 10. For this purpose, the protective flap 86 or protective cap is movable between a closed position and an open position. In the closed position (see FIG. 6), the protective flap 86 shields the underbody camera 74 from the vehicle environment, so that in particular the lens of the underbody camera 74 is covered and cannot be damaged by road stones or soiled by dirt, for example. In the open position (illustrated in FIG. 6 by dashed lines), the underbody camera 74 is exposed so that the field of view of the underbody camera 74 is essentially not obstructed by the protective flap 86 and in particular the area can be viewed which is intended for establishing an electrical connection of the vehicle contact unit 16 with the ground contact unit 12.

To this end, the protective flap 86 may be mounted so as to be displaceable or rotatable, for example, so that the protective flap 86 can be displaced or swiveled to a position in front of the underbody camera 74.

An actuator (not illustrated) is provided to move the protective means 86 from the closed position to the open position.

The protective means 86 is controlled by means of the controller 72. In particular, it may be provided that the controller 72 is configured such that the protective means 86 is adjusted to the open position only when the underbody camera 74 is used to detect the ground contact unit 12 or the contact surfaces 13, and remains closed in all other situations. For example, the underbody camera 74 may be exposed when the vehicle approaches a ground contact unit 12 within a distance of less than 10 m and, at the same time, at a low driving speed, such as less than 10 km/h. The information that the vehicle 10 is in the vicinity of a ground contact unit 12 can be detected by the controller 72, for example through wireless communication such as WLAN, Bluetooth, GPS or radio.

In addition or alternatively, it may also be provided that the driver informs the controller 72 by means of an input that a docking maneuver, i.e. a maneuver in which an electrical connection is established between the vehicle contact unit 16 and a ground contact unit 12, is to be performed. Preferably, the controller 72 closes the protective means 86 automatically when the loading process has been completed or when it is obvious that no docking maneuver is performed, for example when the driving speed exceeds 20 km/h. In this way, it is ensured that the underbody camera 74 is protected when it is not in use.

According to an alternative embodiment, the protective means 86 may be a diaphragm, in particular an iris diaphragm.

In the embodiment shown, the protective means 86 is provided on the vehicle 10. As an alternative, the protective means 86 may be provided directly on the underbody camera 74.

The controller 72 is configured such that it can carry out various analyses, such as, e.g., pattern recognition, using the image data of the cameras 74, 76, 78, 80. To this end, at least one reference image of the ground contact unit 12 is stored in the controller 72. Preferably, several reference images of the ground contact unit 12 are stored in different perspectives and in different conditions, for example with and without soiling (see FIG. 7). Additionally or alternatively, the controller 72 may comprise an image analysis software, which is provided for evaluation of the image data of the cameras 74, 76, 78, 80.

In this way, the controller 72 can identify the ground contact unit 12 of a charging infrastructure and detect the electrical contact surfaces 13 of the ground contact unit 12 as well as an insulation surface 88 (see FIG. 7), which surrounds the electrical contact surfaces 13 and electrically insulates them from each other.

Figure 7:
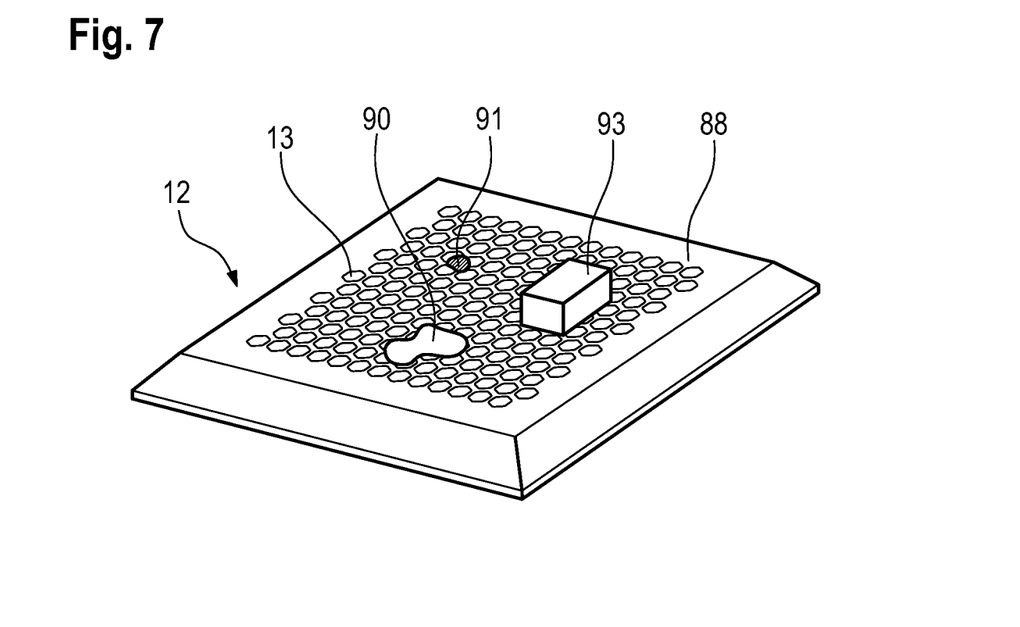
FIG. 7 shows a perspective view of a ground contact unit with various kinds of soiling.

Furthermore, the controller 72 can determine which contact surfaces 13 are exposed and are thus directly suitable for establishing an electrical connection.

The controller 72 can further determine which contact surfaces 13 are not exposed and are therefore not directly suitable for establishing an electrical connection. Non-exposed contact surfaces 13 are distinguished in particular by the fact that they are at least partially covered, for example because the contact surface 13 is dirty or concealed by an object. Here the controller 72 is able to distinguish between cleanable soiling, such as water puddles 90 or loose chippings, and non-cleanable soiling, such as larger stones 91 with a volume of several cm$^3$ or a block of wood 93. Cleanable soiling here involves exclusively soiling which can be removed using the cleaning device of the vehicle connection device 14, i.e. in particular by blowing free.

The controller 72 is also able to identify contact surfaces 13 that are damaged or completely missing, and can classify them as non-cleanable soiling and treat them as such.

Figure 8:
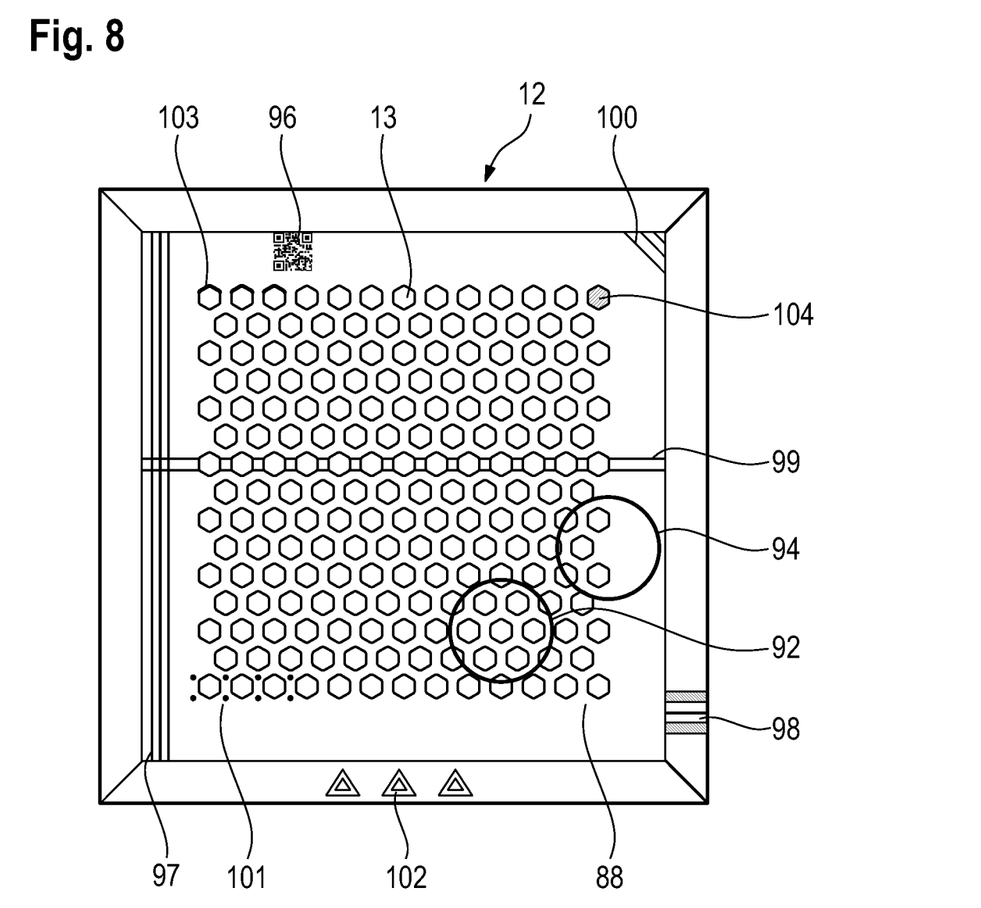
FIG. 8 shows a top view of a ground contact unit with various visual features for orientation.

In order to establish an electrical connection between the vehicle contact unit 16 and the ground contact unit 12, which is suitable for charging the battery of the vehicle 10, a group or combination of three exposed contact surfaces 13 is required, each contact surface 13 adjoining each of the other two contact surfaces 13, so that a kind of triangle is described. In FIG. 8, the area 92 has at least one such group or combination, while the area 94 does not contain such a group.

In an alternative embodiment, both the number and the positions of the exposed contact surfaces 13 of the group that is required to establish an electrical connection may differ. In particular, according to one embodiment, only two exposed contact surfaces 13 may be required therefor.

Optionally, when checking the exposed or cleanable contact surfaces, only those sections of the ground contact unit are taken into consideration which can actually be reached by the vehicle contact unit 16.

After the controller 72 has identified the exposed contact surfaces 13, it can select an area 92 of the ground contact unit 12 that is to be headed for to establish the electrical connection. The area 92 may be larger than the required group of exposed contact surfaces 13 in order to take the dimensions of the vehicle contact unit 16 into account and to ensure in this way that the entire vehicle contact unit 16 rests on the ground contact unit 12 in parallel contact.

When selecting the area of the ground contact unit 12 that is to be headed for to establish the electrical connection, the controller 72 can also incorporate non-exposed but cleanable contact surfaces 13, i.e. the area may comprise one or more non-exposed but cleanable contact surfaces 13. In this case, a cleaning step is performed to expose the contact surface 13.

A cleaning step may also be performed if no soiling was detected, i.e. when the controller 72 classifies all contact surfaces 13 in the area to be contacted as being exposed. In this way, any undetected cleanable soiling can be removed, as a result of which the quality of the electrical connection can be increased.

Without having to move the vehicle 10, after each cleaning step the result of the cleaning can be checked by determining the condition of the contact surfaces 13 by means of the underbody camera 74.

After each cleaning step, the result of the cleaning can be checked by determining the condition of the contact surfaces 13 by means of the underbody camera 74, without having to move the vehicle 10.

The controller 72 further provides a positioning aid which assists the driver in positioning the vehicle 10 or the vehicle connection device 14 relative to the ground contact unit 12, or autonomously steers the vehicle 10 to this position, in which an electrical connection of the vehicle contact unit 16 to the ground contact unit 12 can be established. In particular, this function serves to head for the area 92 which is to be approached for establishing the electrical connection. When the positioning aid assists the driver, the controller 72 provides optical signals, such as direction indications, to the driver for orientation via a display device, for example a display.

In order to be able to determine the relative position of the vehicle 10 in relation to the ground contact unit 12 or the individual contact surfaces 13 more precisely, the ground contact unit 12 may have various features provided thereon (see FIG. 8). The features may also facilitate the detection of the ground contact unit 12 or the individual contact surfaces 13 and/or may provide additional information, for example the identification number of the ground contact unit 12.

In FIG. 8, the following features are provided on the ground contact unit 12: a QR code 96, various binary bar codes or lines 97, 98, 99, 110, a pattern 101 of equidistant dots arranged around individual contact surfaces 13, three triangular symbols 102, the middle one of which is aligned with the middle of the ground contact unit 12, arrow-shaped markings 103 which emphasize the contours of individual contact surfaces 13, and a contact surface 104 which distinguishes itself by a contrast that is different from that of the other contact surfaces 13, for example due to a particular coloring. Furthermore, the contact surfaces 13 may form one or more features by their shapes, orientations and/or arrangements.

The positioning aid can provide the positioning of the vehicle 10 relative to the ground contact unit 12 or the individual contact surfaces 13 with an accuracy of ±40 mm, more particularly ±10 mm, by means of the features and when a high resolution camera 74, 76, 78, 80, in particular the underbody camera 74, is used.

Figure 9:
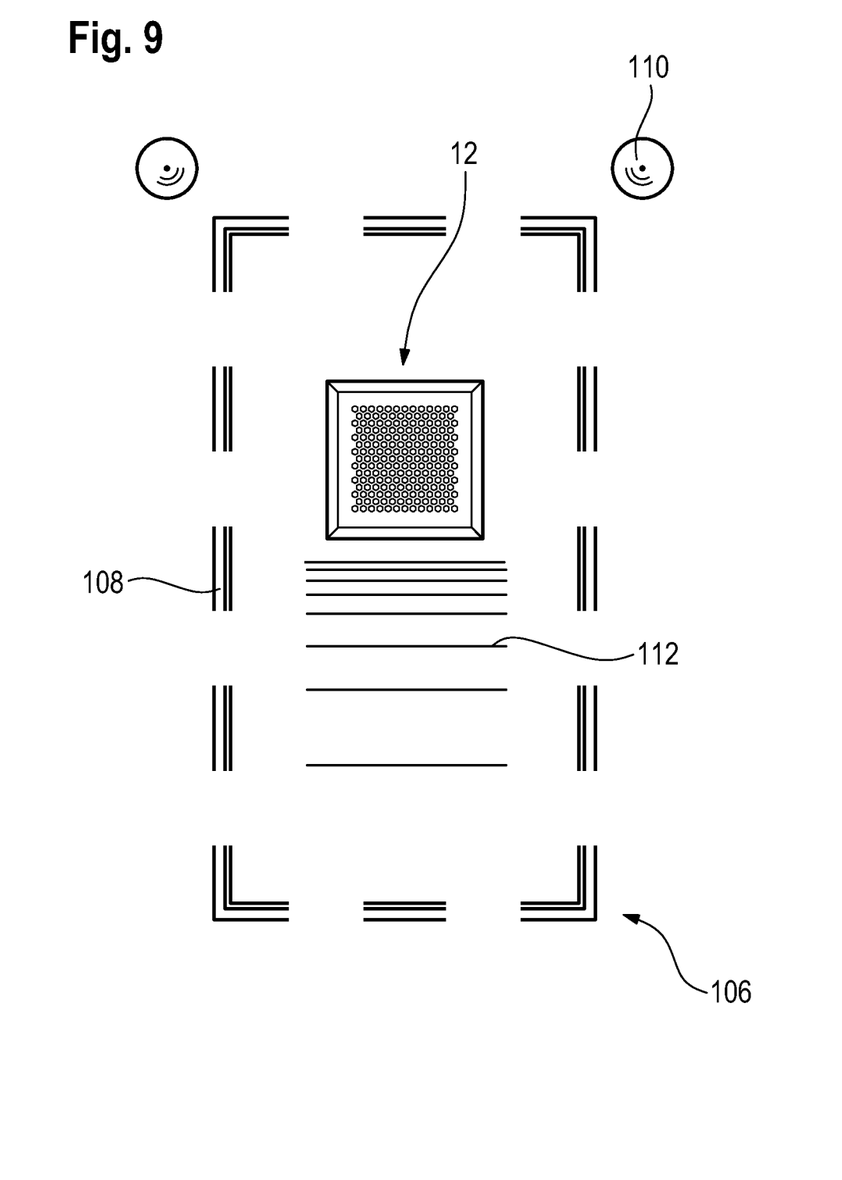
FIG. 9 shows a top view of a parking space with various visual features for orientation.

In addition or alternatively, features may be provided at a close range of approx. 3 m from the ground contact unit 12, which make it easier for the controller 72 to determine the position or orientation of the vehicle 10 or allow conclusions to be drawn about the presence of a ground contact unit 12, even if it has not (yet) been directly detected, for example because it is covered by a layer of leaves or snow.

FIG. 9 shows a parking space 106 having a ground contact unit 12 and which is intended as a parking spot for the vehicle 10 during the charging process.

The parking space 106 has a boundary 108 in the form of a marking on the ground, which is formed by a border formed of three parallel lines. The fact that the distance between the lines decreases toward the middle of the parking space 106 indicates on which side of the boundary 108 the ground contact unit 12 of the parking space 106 is located.

Transmitters 110 are provided at two of the corners of the parking space 106 and provide an electromagnetic signal which can be utilized by the controller 72 for orientation.

A plurality of lines 112 extending from the ground contact unit 12 are provided within the boundary 108, which run parallel to an edge of the ground contact unit 12. The distance of the lines 112 relative to each other increases as the distance from the ground contact unit 12 increases, so that the distance between the lines 112 can be used as an indicator for the distance from the ground contact unit 12.

The above-mentioned features are stored as a reference in the controller 72 and can thereby be recognized and interpreted by the controller 72.

In summary, the procedure for establishing an electrical connection of the vehicle contact unit 16 to a ground contact unit 12 of an electric charging infrastructure is outlined below.

In the exemplary embodiment shown, the vehicle 10 approaches a ground contact unit 12, the spatial proximity of which is detected by the GPS position stored in a map or by receiving the wireless communication signal, such as WLAN, Bluetooth or radio. Within close range of the ground contact unit 12, the vehicle 10 reduces its speed to less than 10 km/h and exposes the underbody camera 74 in that the optional protective means 86 is opened. The cameras 74, 76, 78, 80 are used to determine the position and orientation of the ground contact unit 12. Here, the controller 72 makes use of the features at the parking space 106 and at the ground contact unit 12 for orientation. After the ground contact unit 12 has been detected, the controller 72 uses the image data of the cameras 74, 76, 78, 80 to determine which contact surfaces 13 are suitable for establishing an electrical connection. Now the vehicle autonomously steers towards the area with the selected group of contact surfaces 13 or assists the driver in doing so. When the position is reached in which the vehicle contact unit 16 is located vertically above the selected area, the vehicle contact unit 16 is lowered and a cleaning step is performed to remove soiling and improve the quality of the electrical connection.

If heavy soiling was detected in the selected area, the vehicle contact unit 16 is subsequently raised again and the cleaning result is checked using the underbody camera 74. Depending on the degree of soiling, further cleaning steps may now follow to expose the contact surfaces 13. Alternatively, it is also possible to approach a different area on the ground contact unit 12. This can be effected either by moving the vehicle contact unit 16 also laterally and/or by moving the vehicle autonomously.

When the area has been cleaned or if no soiling was detected in the selected area, the vehicle contact unit 16 is moved downward against the ground contact unit 12 and, optionally, a cleaning step is carried out. When the contact between the electrodes 34 and the contact surfaces 13 has been established, the contacted contact surfaces 13 are connected and the process of charging the vehicle battery begins. During the charging process, the ground contact unit 12 is monitored by means of the underbody camera 74 in order to initiate a protective reaction, for example if an animal approaches the vehicle contact unit 16. When the charging process is completed or is to be discontinued, the contacted contact surfaces 13 are disconnected again and the vehicle contact unit 16 is retracted. Finally, the protective means 86 is closed in order to shield the underbody camera 74, and the vehicle 10 is ready to continue its journey.

In this way, an electrical connection of the vehicle contact unit 16 to the ground contact unit 12 of the charging infrastructure can be provided with high quality and low losses.

The embodiments described should only be regarded as exemplary versions. The features described may, of course, be combined with each other as desired.

What is claimed is:

1. A method for establishing an electrical connection of a vehicle contact unit of a vehicle which is at least in part electrically powered, to a ground contact unit of an electric charging infrastructure which has a plurality of electrical contact surfaces, at least two of which have to be contacted by the vehicle contact unit for charging a battery of the vehicle, wherein the method comprises steps of:
   detecting visual features on the ground contact unit with aid of at least one camera on the vehicle, wherein the visual features comprise the electrical contact surfaces of the ground contact unit, and
   at least one of
   a) autonomously steering the vehicle in a position in which the vehicle contact unit can be coupled to a selected area of the ground contact unit, and
   b) outputting visual signals in an interior of the vehicle to a driver to indicate to the driver where the driver has to steer the vehicle so that the electrical connection of the vehicle contact unit of the vehicle to the ground unit can be established.

2. The method according to claim 1, wherein the detection of the visual features is achieved by aid of an arrangement and/or a shape and/or an orientation of the electrical contact surfaces of the ground contact unit and/or of markings provided directly on the ground contact unit.

3. The method according to claim 1, wherein the detection of the visual features is achieved by aid of reflection and/or intensity of the reflection of light from a lighting device of the vehicle contact unit at the contact surfaces.

4. The method according to claim 1, wherein the detection of the visual features is achieved by aid of markings or codes on the ground contact unit.

5. The method according to claim 1, wherein the visual features of the ground contact unit are stored in a controller for conducting the method, wherein the controller uses the stored visual features as a reference for the detection of the visual features on the ground contact unit.

6. The method according to claim 1, wherein, in addition to the visual feature on the ground contact unit, sensors or facilities detecting electromagnetic fields are used for positioning.

7. The method according to claim 1, wherein, in addition to the visual feature on the ground contact unit, sensors, at least one coil and/or at least one radio transmitter arranged in the ground contact unit and a corresponding receiver for electromagnetic signals and/or radio signals are used for positioning.

8. The method according to claim 1, comprising the step of selecting an area of the ground contact unit that is to be headed for electrical connection, the area including a group of exposed contact surfaces by means of which the electrical connection can be established.

9. The method according to claim 8, wherein after selecting the area, the vehicle is moved, steering automatically, or optical steering signals are output in the interior for the driver for manual steering of the vehicle in order to place the vehicle contact unit in a position in which it can be coupled to the selected contact surfaces.

10. A vehicle connection device for electrically connecting a vehicle contact unit of a vehicle which is at least in part electrically powered, to a ground contact unit of an electric charging infrastructure which has a plurality of electrical contact surfaces, at least two of which have to be contacted by the vehicle contact unit for charging a battery of the vehicle, comprising the vehicle contact unit, at least one camera and a controller coupled to the camera, wherein the controller is configured such that it can detect visual features on the ground contact unit with aid of the at least one camera, wherein the electrical contact surfaces of the ground contact unit constitute the visual features for the controller.

11. The vehicle connection device according to claim 10, wherein the vehicle connection device comprises a cleaning device, which is provided for exposing the electrical contact surfaces of the ground contact unit at least in a selected area.

12. The vehicle connection device according to claim 10, wherein the visual features on the ground contact unit are stored in the controller as a reference.

13. The vehicle connection device according to claim 10, wherein markings or codes on the ground contact unit constitute a visual feature for the controller.

14. The vehicle connection device according to claim 10, wherein the controller or a further controller provided each are constituted to
- autonomously steer the vehicle in a position in which the vehicle contact unit can be coupled to selected contact surfaces, and/or
- output visual signals in an interior of the vehicle to a driver to indicate to the driver where the driver has to steer the vehicle so that the electrical connection of the vehicle contact unit of the vehicle to the ground unit can be established.

15. The vehicle connection device according to claim 14, wherein sensors or facilities detecting electromagnetic fields are provided for positioning the vehicle relative to the ground contact unit.

16. A vehicle comprising a vehicle connection device for electrically connecting a vehicle contact unit of a vehicle which is at least in part electrically powered, to a ground contact unit of an electric charging infrastructure which has a plurality of electrical contact surfaces, at least two of which have to be contacted by the vehicle contact unit for charging a battery of the vehicle, the vehicle connection device comprising the vehicle contact unit, at least one camera and a controller coupled to the camera, wherein the controller is configured such that it can detect visual features on the ground contact unit with aid of the at least one camera, the controller or a further controller provided each are constituted to
- autonomously steer the vehicle in a position in which the vehicle contact unit can be coupled to selected contact surfaces, and/or
- output visual signals in an interior of the vehicle to a driver to indicate to the driver where the driver has to steer the vehicle so that the electrical connection of the vehicle contact unit of the vehicle to the ground unit can be established,
wherein the electrical contact surfaces of the ground contact unit constitute the visual features for the controller.

17. The vehicle according to claim 16, wherein the vehicle includes a controller and cameras connected thereto for positioning the vehicle relative to the ground contact unit.

18. The vehicle according to claim 16, wherein the vehicle connection device comprises sensors or facilities detecting electromagnetic fields for positioning the vehicle relative to the ground contact unit.

* * * * *